United States Patent [19]
Fricker

[11] Patent Number: 5,243,805
[45] Date of Patent: Sep. 14, 1993

[54] MOLDING AND SUPPORTING ANCHOR TO BE CEMENTED IN A BOREHOLE IN A MOUNTING BASE

[75] Inventor: Siegfried Fricker, Wiernsheim, Fed. Rep. of Germany

[73] Assignee: Unistrut Europe plc, Bedford, England

[21] Appl. No.: 656,027

[22] Filed: Feb. 15, 1991

Related U.S. Application Data

[63] Continuation of Ser. No. 430,176, Nov. 1, 1989, abandoned, which is a continuation of Ser. No. 143,108, Jan. 12, 1988, Pat. No. 4,922,679.

[30] Foreign Application Priority Data

Jan. 13, 1987 [DE] Fed. Rep. of Germany ....... 3700743
May 27, 1987 [DE] Fed. Rep. of Germany ....... 3717816

[51] Int. Cl.⁵ .................................................. E04B 1/38
[52] U.S. Cl. ........................................ 52/698; 52/733; 52/735; 52/740
[58] Field of Search ................. 52/698, 733, 735, 740, 52/508, 513; 405/259, 260, 261, 262

[56] References Cited

U.S. PATENT DOCUMENTS

| | | | |
|---|---|---|---|
| 872,127 | 11/1907 | Havemeyer | 52/740 |
| 928,430 | 7/1909 | Dudley | 52/740 |
| 940,399 | 11/1909 | Mueser | 52/740 |
| 1,050,834 | 1/1913 | Inman et al. | 52/740 |
| 1,788,481 | 1/1931 | Brostrom | 52/700 |
| 2,117,833 | 5/1938 | Wellner | 52/698 |
| 2,842,811 | 7/1958 | Weeks | 52/735 |
| 3,286,419 | 11/1966 | Eriksson | 52/698 |
| 4,238,987 | 12/1980 | Reuter | 52/698 |
| 4,316,677 | 2/1982 | Ciavatta | 405/259 |

FOREIGN PATENT DOCUMENTS

2137273 10/1984 United Kingdom ................. 52/698

Primary Examiner—Michael Safavi
Attorney, Agent, or Firm—Foley & Lardner

[57] ABSTRACT

This invention discloses a holding and supporting anchor adapted to be mortared in a borehole of a construction element. The anchor has a supporting section at one end which is designed to engage and support a facing plate and a tubular longitudinal section which is rearward of the support section and which has a series of deformations. The tube is designed to extend within the borehole and provide a solid anchor for absorbing torsional, compressional and tensile forces.

20 Claims, 7 Drawing Sheets

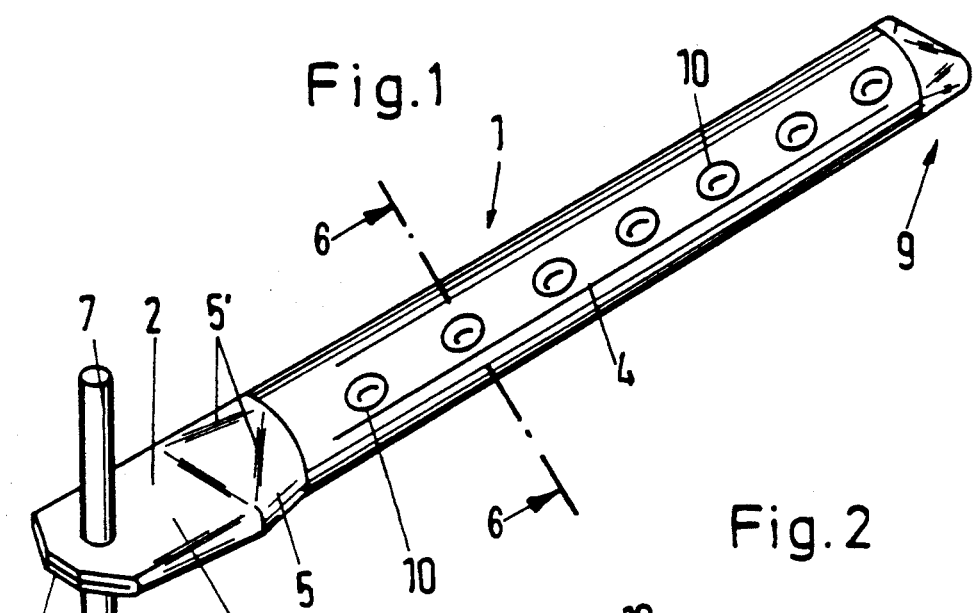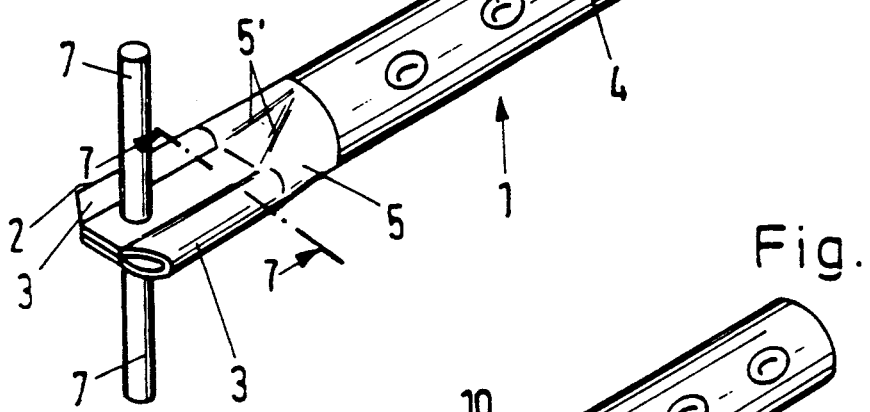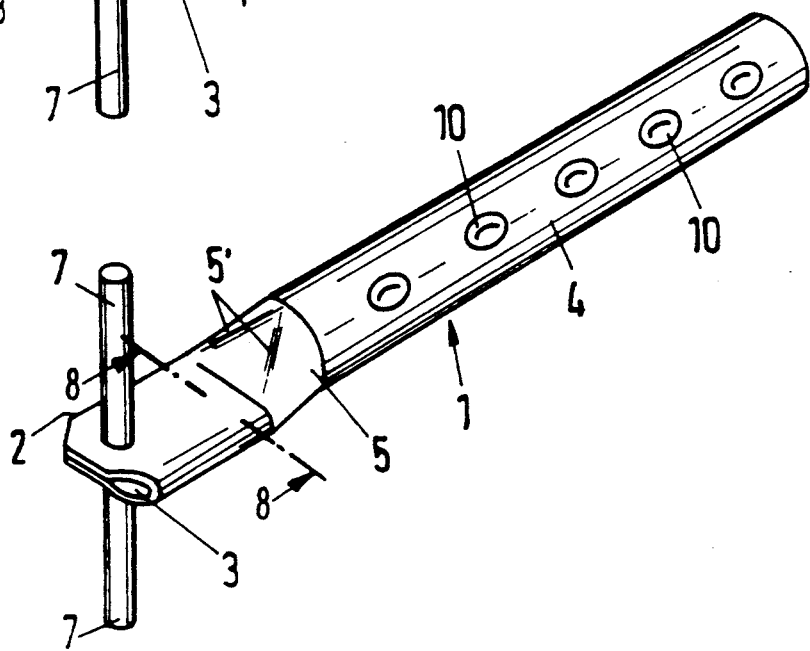

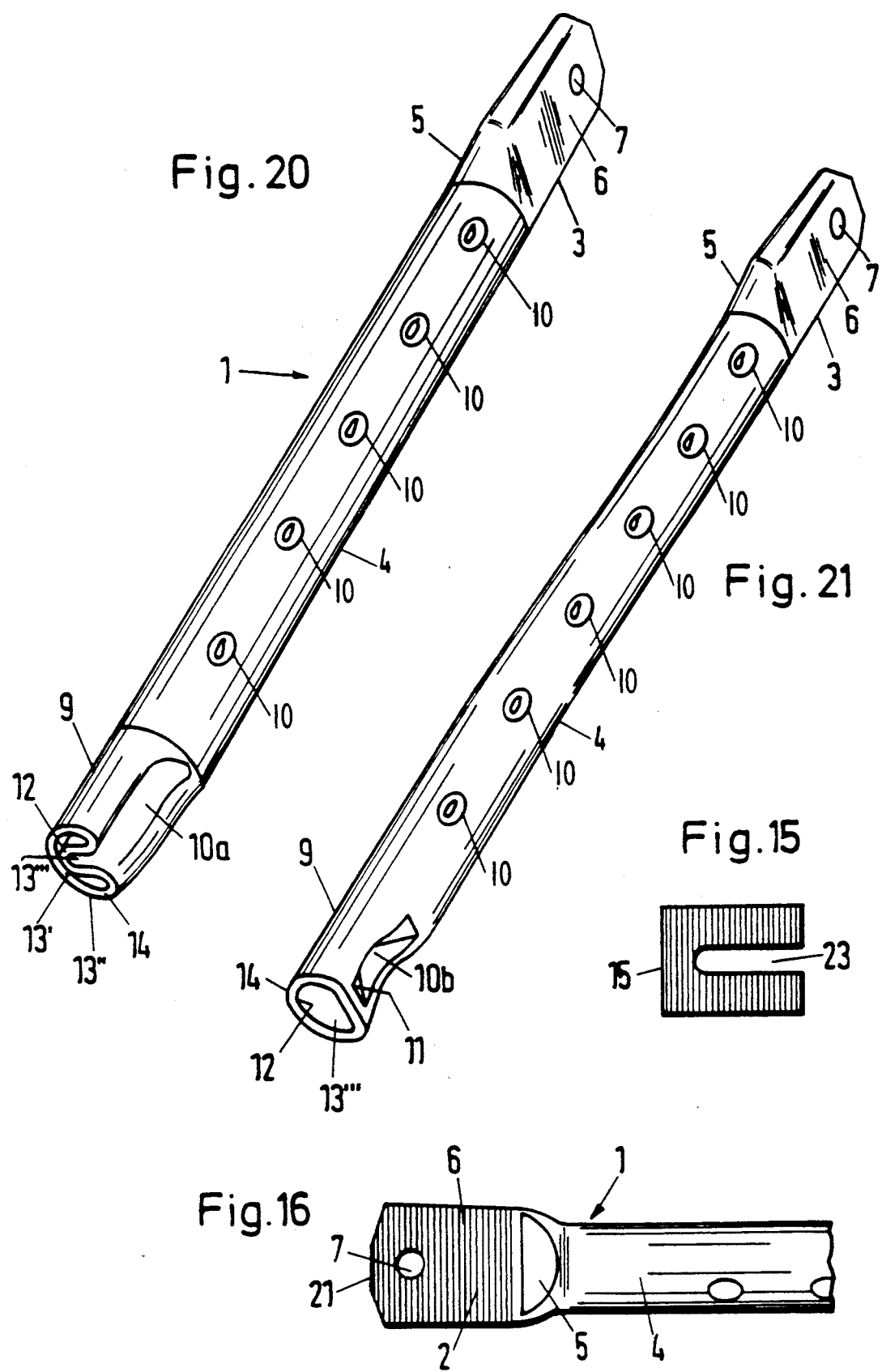

MOLDING AND SUPPORTING ANCHOR TO BE CEMENTED IN A BOREHOLE IN A MOUNTING BASE

This application is a continuation of application Ser. No. 07/430,176, filed Nov. 1, 1989, now abandoned which is in turn a continuation application of Ser. No. 07/143,108, filed Jan. 12, 1988, now U.S. Pat. No. 4,922,679, dated May 8, 1990.

BACKGROUND OF INVENTION

1. Field of the Invention

The present invention relates to a holding and supporting anchor to be cemented in a borehole in a mounting base such as concrete, masonry, etc.

Such anchors are used, for example, for attaching facing plates on the outside walls of buildings. For this purpose boreholes are provided in the outer wall of the building, which may consist of concrete, masonry, or the like, and which is known as a facade or mounting base. The anchors are inserted with part of their length, the "mounting section", into said borehole and are fixed in it, usually by a mortar. Facing plates consisting, for example, of natural stone, a synthetic material, or the like—are placed on, and held by the part of the anchor protruding from the borehole, the "supporting section".

2. Description of the Prior Art

A known anchor of this type consists of a longitudinal section having an S-shaped cross section which ensures that the vertically positioned web can securely take up the load. The load carrying cross section, i.e. the supporting surface of this type of anchor seen in vertical projection in direction of the load to be supported, which surface applies the load to the mounting base through cement mortar, is relatively small in this type of known anchor. An S-shaped anchor of this type with a web part oriented in the vertical plane—known as an "upright web"—and a horizontal section can only be used for insertion into the horizontal joints between facing plates placed one above the other. If this anchor was to be inserted into vertical joints between facing plates placed side by side, the supporting section of the anchor would be located in the vertical joint between the two plates placed side-by-side, but in this case the upright web would be in a horizontal position and load would no longer be applied to the vertical part of the S-shaped cross section of the anchor, i.e. its "upright web". Accordingly, the known anchor is unsuitable for being mounted in this position because it could not carry a sufficient load, such that two different types are required if this anchor is to be used. for insertion in the horizontal joint between facing plates placed vertically one above the other, as well as in the horizontal joints between facing plates placed side-by-side. There different types of anchor for use in horizontal joints and vertical joints, respectively, have to be separately manufactured and separately stored by manufacturer and user, which causes considerable costs.

SUMMARY OF THE INVENTION

The object of the present invention is to provide a holding and supporting anchor that is equally suitable for insertion in both vertical and horizontal joints between two plates to be mounted, without losing any of its load carrying capacity, and which is simple and cheap to manufacture as a mass-produced article, and is suitable for all cases of building-in.

This object is achieved by an anchor of the type described being provided with a longitudinal section in the form of a tube, i.e. having a tubular cross section, whose mantle is provided with surface deformations such as protrusions and/or recesses arranged behind each other the longitudinal direction of the longitudinal section with said recesses being preferably formed by deformation of the mantle of the tube, and said protrusions by attached elements such as burls, warts, or the like. The tube is preferably a closed tube, on whose mantle the raised and recessed features may be formed by deformation of the mantle. It is also possible, however, to attach the raised features such as burls, warts, or the like by welding them onto the mantle surface of the tube. Such an anchor according to the present invention has a large section modulus and, therefore, a high load carrying capacity in any built-in position. Its length can be easily adapted to different depths of the borehole by simply cutting the tube to suit the particular bore hole depth. The anchor retains its full load carrying position in any built-in position rotated by 90° if the surface deformations, i.e. the protrusions and recesses, are arranged symmetrically on the mantle surface of the tube or if they are arranged such that they are located outside the load supporting plane (Y—Y) and outside the horizontal plane (X—X). This is the case in particular if the Y—Y axial plane and the X—X axial plane are kept free from surface deformations. The high load carrying capacity of the holding and supporting anchor according to the present invention results in particular from the fact that the protrusions and/or recesses of the mantle surface of the tube are suitably shaped as individual deformation at a certain distance from each other, such that, in a radial section through a protrusion or recess the part of the tube adjacent to the protrusion or recess retains its original diameter and that, therefore the original diameter of the tube is only changed in the region of the individual recesses in the mantle surface while the diameter remains unchanged outside the protrusions or recesses.

Accordingly, the load carrying plane is always located at a part of the tube having the maximum diameter such that the original high section modulus of the tube is retained irrespective of any recesses. Therefore, a single type of anchor according to the present invention can be used for insertion into either vertical or horizontal joints, while the built-in position in the vertical and horizontal joints may also be rotated by 180°. Another important advantage is that the longitudinal section of the anchor can be shortened to any required length in the field, i.e. on the building site, and can thereby be adapted to the actual depth of the particular borehole.

The contact surface of the part of the longitudinal section of the tube being fixed in the borehole—i.e. the mantle surface of the anchor that transfers the load carried by the anchor to the mounting base, i.e. the masonry or concrete wall—corresponds to the projection of the cross section of the tube seen in the direction of the force exerted by the load carried by the anchor. Since, in the preferred embodiment, the cross section of the tube is not deformed in the Y—Y axial plane and in the X—X axial plane, the width of the contact surface always corresponds to the maximum diameter of the cross section of the tube, irrespective of the built-in position of the anchor. Both section modulus of the preferably closed tube, i.e. of the cross section of the tube, and the size of the contact surface are larger than those of the known S-shaped anchor made of flat iron, such that, for a given load, the anchor according to the present invention can be simpler and smaller, and, thereby, permits achieving savings in material, in addition a holding and supporting anchor of smaller dimensions requires smaller boreholes in the mounting base such that, in particular, such smaller anchors can be more simply mounted on site, with the use of lighter tools and smaller quantities of cement mortar.

The anchor according to the present invention is also capable of taking up stronger wind forces (suction and compressive forces as well as bending stresses) than the known anchors, such that larger safety factors can be achieved with the same borehole dimensions.

In further development of the present invention the surface irregularities are provided on approximately diametrically opposite sections of the circumference of the tubular anchor, with these surface irregularities being preferably arranged symmetrically with respect to the bisecting line of the angle enclosed by the horizontal plane (X—X) and the vertical plane (Y—Y).

The deformations may be recesses and/or protrusions in the wall of the anchor tube, i.e. in the wall of the cross section of the tube, and may take the shape of dents, teeth, corrugations, burls, or warts. They are arranged one behind the other in the longitudinal direction of the longitudinal section of the anchor, while a side-by-side arrangement may also be suitable.

In a preferred embodiment the anchor is formed from a single piece of tube, with one end of this tube being flatted to form a flat supporting section lying in one of the plane—preferably the horizontal X—X plane—adjoining the longitudinal section with a conical transition.

The supporting section is preferably provided with hollow ribs, formed during manufacture, which are oriented in longitudinal direction of the anchor and increase the section modulus of the supporting section of the tube to make it more resistant against buckling. The conical transition extends preferably to the front edge of the supporting section on its lower side facing away from the contact surface on its upper side, which results in significant strengthening against buckling of the supporting section. Also the conical transition is strengthened by reinforcing ribs. In further development of the present invention the longitudinal section of the holding and supporting anchor is provided with an opening serving for pressing-in the mortar. An anchor of this type is first inserted into the borehole as far as the opening, is then aligned, and mortar is pressed through the opening into the interior of the anchor. The mortar emerges from the open end of the longitudinal section and is pressed through the gap between the longitudinal section and the wall of the borehole towards the outer side of the mounting base. A press is used to press sufficient mortar through the opening until mortar emerges at the outside of the mounting base. This method ensures fixing of the holding and supporting anchor in the mounting base by means of a homogeneous and tight mass of mortar free from any cavities.

A stopper can be placed inside the tube for closing its end facing the supporting section in order to prevent mortar emerging from the supporting section that may be open in certain cases.

Further characteristics of the present invention following from the other the description, and the drawings that describe embodiments of the present invention in greater detail.

BRIEF DESCRIPTION OF THE APPLICATION DRAWINGS

FIG. 1 A perspective view of a first embodiment of the holding and supporting anchor according to the present invention.

FIG. 2: A perspective view of a second embodiment of the holding and supporting anchor according to the present invention.

FIG. 3: A perspective view of a third embodiment of the holding and supporting anchor according to the present invention with the anchor tube being open.

FIG. 4: A perspective view of a fourth embodiment of the holding and supporting anchor according to the prevent invention with pin-like protrusions being provided on the mantle of the tube.

FIG. 5: A perspective view of an embodiment of the holding and supporting anchor according to the present invention with the supporting section being set-off from the axis of the tube.

FIG. 6: Section 6—6 in FIG. 1.

FIG. 7: Section 7—7 in FIG. 2.

FIG. 8: Section 8—8 in FIG. 3.

FIG. 9: Front elevation of the supporting section of an anchor according to FIG. 3 placed in a horizontal joint between plates.

FIG. 10: Front elevation of the supporting section of an anchor according to FIG. 2 placed in a vertical joint between plates.

FIG. 11: A perspective view of an anchor according to FIG. 1 with a supporting section placed in a vertical joint between plates.

FIG. 12: A perspective view of an anchor according to FIG. 1 being cemented-in in the mounting base, with its supporting section placed in a horizontal joint between plates.

FIG. 13: A perspective view of an anchor being fixed in the borehole in the mounting base by means of the mortar pressed-in through the tubular section.

FIG. 14: A side elevation of a further embodiment of an anchor with the contact surface of the supporting section being inclined with respect to the horizontal plane and with an equalizing wedge being inserted between contact surface and plate.

FIG. 15: Plan view of the equalizing wedge according to FIG. 14.

FIG. 16: Plan view of the contact surface of the anchor according to FIG. 14.

FIG. 17: Side elevation of a further embodiment of the anchor according to the present invention with the end of the supporting section bent at a right angle to form a holding bracket.

FIG. 18: An embodiment similar to that shown in FIG. 17, with the end of the supporting section being bent upward at an oblique angle.

FIG. 19: Side elevation of a holding and supporting anchor with a supporting section being formed by an iron bracket attached to the front end of the anchor.

FIG. 20: A holding and supporting anchor according to the present invention with the end of its longitudinal section being crimped to form a groove which practically closes off the end of the tubular section.

FIG. 21: A holding and supporting anchor similar to that shown in FIG. 20, with the end of the longitudinal section of the tube of the anchor being crimped into a different shape.

DETAILED DESCRIPTION OF THE PREFERRED EMBODIMENTS

Figure 12:
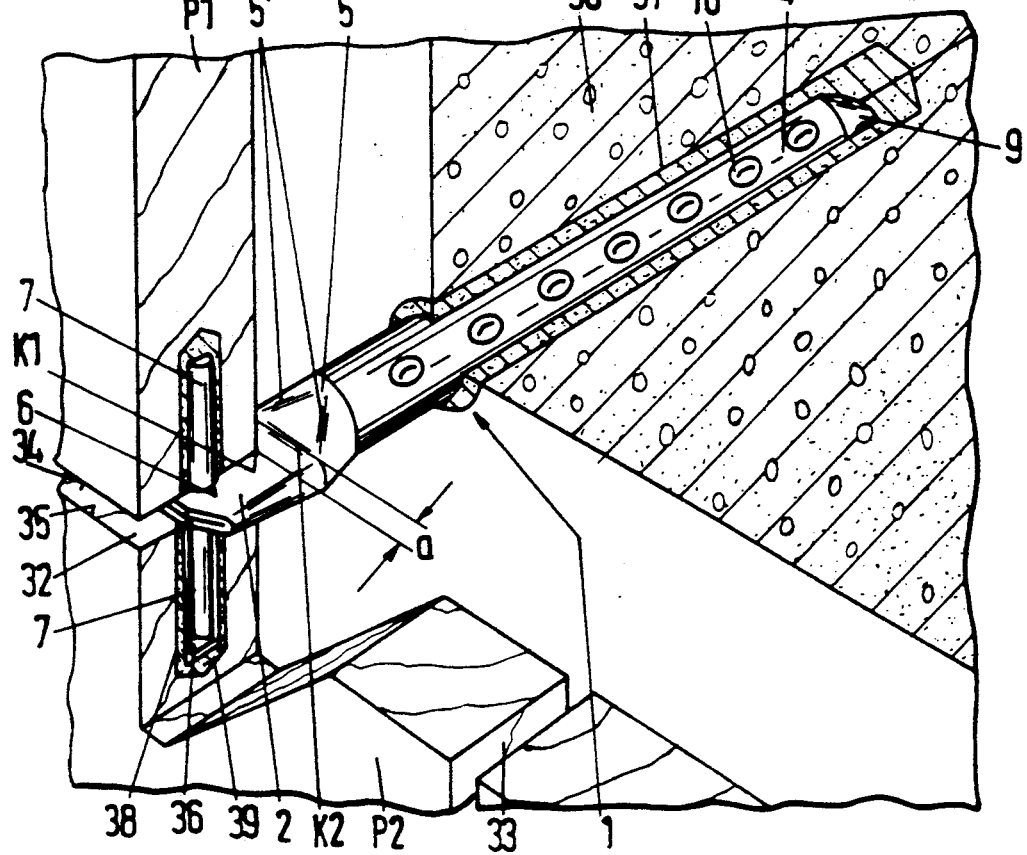

The holding and supporting anchors—briefly referred to as "anchor" in the following—consist essentially of a frontal supporting section 2 with a holding part and a longitudinal section 4 to be cemented in a borehole 31 in the mounting base 30 (FIG. 12). Longitudinal section 4 and supporting section 2 of anchor 1 are connected by a conical transition section 5.

The anchor 1 according to the present invention is formed from a closed tube, preferably of steel, which may have any desired cross section. A circular cross section is preferred, but the cross section may also have an oval or polygonal shape. The embodiments shown by way of example are based on a tube of circular cross section, cut off to size from a longer tube.

The tube cut to length is suitably crimped radially at one end to form the supporting section 2 by the circumferential sections of the tube lying opposite each other in the vertical (Y—Y) plane being flattened and pressed against each other. The tightly pressed together end of the supporting section 2 (FIG. 1) prevents water from entering into the anchor from this end.

In the embodiment shown in FIG. 1 the supporting section 2 has an upper contact surface 6 for the plate P1 to be held (FIG. 12), with a holding pin 7 being vertically attached to the supporting section 2. The supporting section is oriented in the X—X axial plane (FIG. 6) of the tube, and its width measured at right angles to the longitudinal axis of the anchor 1 is larger than the diameter of the tube or of longitudinal section 4, respectively. The conically shaped transition 5 between longitudinal section 4 and supporting section 2 ensures a smooth and strong transition. The transition section tapers down in the Y-axis of the tube from the diameter of the longitudinal section of the tube to the thinner supporting section 2, while in the X-axis it widens conically from the diameter of the longitudinal section 4 to the somewhat greater width of the supporting section 2. This shape ensures great resistance to tensile, compressive, and bending forces acting on this part of the anchor 1, consisting of the supporting section 2 and the transition section 5, which is highly stressed by weight forces and external forces such as wind, snow, etc.

The supporting section 2 (FIG. 1) is preferably provided with only one contact surface 6, while on the lower, wider side of supporting section 2 the transition section 5 extends with its conically tapered shape as far as the front edge 21 of the supporting section 2, which reinforces the supporting section 2 against buckling. The stiffness of the conical transition section 5 may be further increased by providing reinforcing ribs 5'. The anchor shaped according to the present invention offers the particular advantage that only small cross sections are required, which not only permit achieving savings in material but also simply the manufacture of the anchor itself. The tube forming the longitudinal section 4 is provided with surface irregularities arranged one behind the other in the longitudinal direction, such as recesses 10 and/or protrusions 10' such as attached warts, burls, small plates, or the like. All embodiments shown by way of example, except that in FIG. 4, are provided with deformations 10 in the shape recesses, i.e. of dents.

Figure 4:

FIG. 4 shows an embodiment with wart-like protrusions 10' attached to the mantle surface of the longitudinal section 4.

It is expedient to arrange these surface irregularities, i.e. the recesses 10 and/or protrusions 10' (FIG. 4) symmetrically with respect to the horizontal plane X—X and/or to the vertical plane Y—Y of the tube in such a manner that the cross section of the tube retains its original diameter in the sections between the surface irregularities 10. Accordingly, each deformation 10 or 10' is locally limited and does not affect the remaining parts of the cross section of the tubular longitudinal section 4 which, accordingly, retain its original load carrying capacity.

Figure 6:
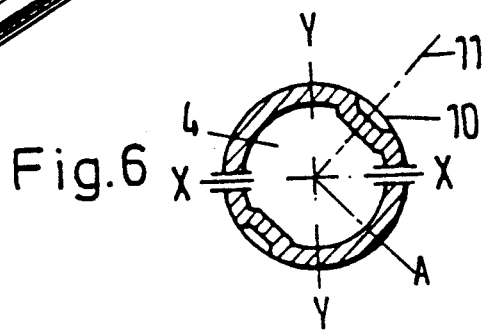
Figure 14:
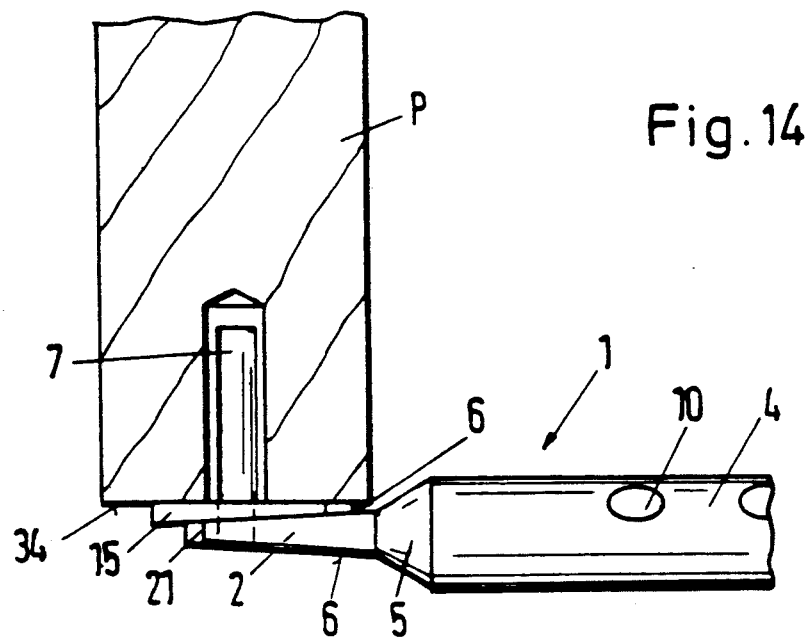

FIG. 6, which is a cross section along line 6—6 in FIG. 1, shows that the dent-shaped deformations 10 are located outside the vertical plane Y—Y and the horizontal plane X—X. With reference to the anchor shown in FIGS. 1 and 6, and the position in which this anchor is built-in as shown in FIG. 12, Y—Y is the vertical load carrying plane and X—X is the horizontal plane at right angles to the former. The two planes intersect in the longitudinal axis A of the anchor or tube, respectively (FIG. 6). The supporting section 2 lies in the horizontal plane X—to which is attached the vertical holding pin 7 holding the plate to be mounted (FIGS. 12 and 14).

In the preferred embodiment of the present invention shown by way of example in FIG. 6, the deformations are located outside the axial planes Y—Y and X—X, respectively. In FIG. 6, the surface irregularities are recesses 10 provided in approximately diametrically opposite wall sections of the tube. Each recess 10 is positioned symmetrically with respect to the bisecting line 11 of the right angle enclosed between planes Y—Y and X—X.

Apart from recesses such as the dents 10 shown by way of example, also protrusions 10' may be used, as shown schematically in FIG. 4. Accordingly, teeth, corrugations, burls, warts, or small plates are suitable embodiments of the surface irregularities provided according to the present invention.

Neither deformations taking the shape of recesses in the surface of the tube nor protrusions on the surface of the tube essentially alter the initial cross section of the anchor, for example the original tube cross section, such that the original load carrying capacity of the anchor is fully retained.

The open rear end 9 of the longitudinal section 4 (FIG. 1) is expediently tapered to facilitate driving-in of the anchor 1 into a borehole 31 (FIG. 12) filled with cement mortar or concrete, with the cement mortar or concrete being pressed by the tapered end 9 towards the wall of the borehole. The conical shape of end 9 ensures high strength.

The tapered end 9 may also be formed by inserting a tapered plug 8 FIG. 21 into the end 9 of the longitudinal section 4 rather than by deformation of the latter. Plug 8 or the tapered end 9, respectively, is expediently shaped to form a conical point (FIG. 2), a cone, or a cutting edge (FIG. 1). Also other shapes resulting in displacement of the cement mortar or concrete, respectively, are suitable.

In the built-in state shown in FIG. 12 the anchor 1 is positioned with its supporting section 2 inserted into a horizontal gap 32 between two vertically arranged plates P1 and P2 to be mounted, with the supporting side 34 of plate P1 resting on the contact surface 6 of the supporting section 2 of anchor 1 facing it. The contact surface 6 is made as long as possible in its longitudinal direction, i.e. in direction of its longitudinal axis A (FIG. 6), such that its inner edge K2 is located close to the mounting base 30, which makes it possible also for the inner edge K1 of plate P1 to be located close to the mounting base 30, such that the effective length of the lever arm of the section of anchor 1 that protrudes from the mounting base 30, and thereby also the bending stress acting on anchor 1, can be made as small as possible. Accordingly, the anchor dimensions can be correspondingly smaller, resulting in savings in material, it is expedient, therefore, to minimize the distance between edges K1 and K2 (FIG. 12).

It is further seen in FIG. 12 that plate P1 sitting on contact surface 6 is held in position by the vertical holding pin 7 engaging a borehole filled with mortar in the supporting side 34 of plate P1. On the side of supporting section 2 facing away from the contact surface 6, holding pin 7 engages the narrow holding side 35 of plate P2 placed underneath. To achieve this a borehole 38 is provided in the narrow holding side 35, in which a sleeve 36 of a synthetic material is fixed by means of a cement mortar 39, Holding pin 7 engages the plastic sleeve 36 with axial play, such that plate P2 located at a smaller distance from supporting section 2 is free to move vertically as the result of thermal expansion.

The design of anchor 1 according to the present invention, with the surface deformations 10 or 10' provided in the mantle of the tube, ensures that the cemented-in anchor 1 is securely held in borehole 31 of the mounting base 30 (FIG. 12.). Anchor 1 is capable of taking up large tensile and compressive forces since the concrete or mortar, respectively, engages recesses 10 and thereby ensures a form-fit connection between anchor and mortar. The weight of the plate acting in the Y—Y plane is transferred to the mounting base 30 through a large load carrying area corresponding to the original cross sectional area of the tube that is not affected by the surface deformations 10, while the shape of the tube that has not been deformed in the load carrying plane ensures a high section modulus to resist buckling forces.

Figure 11:
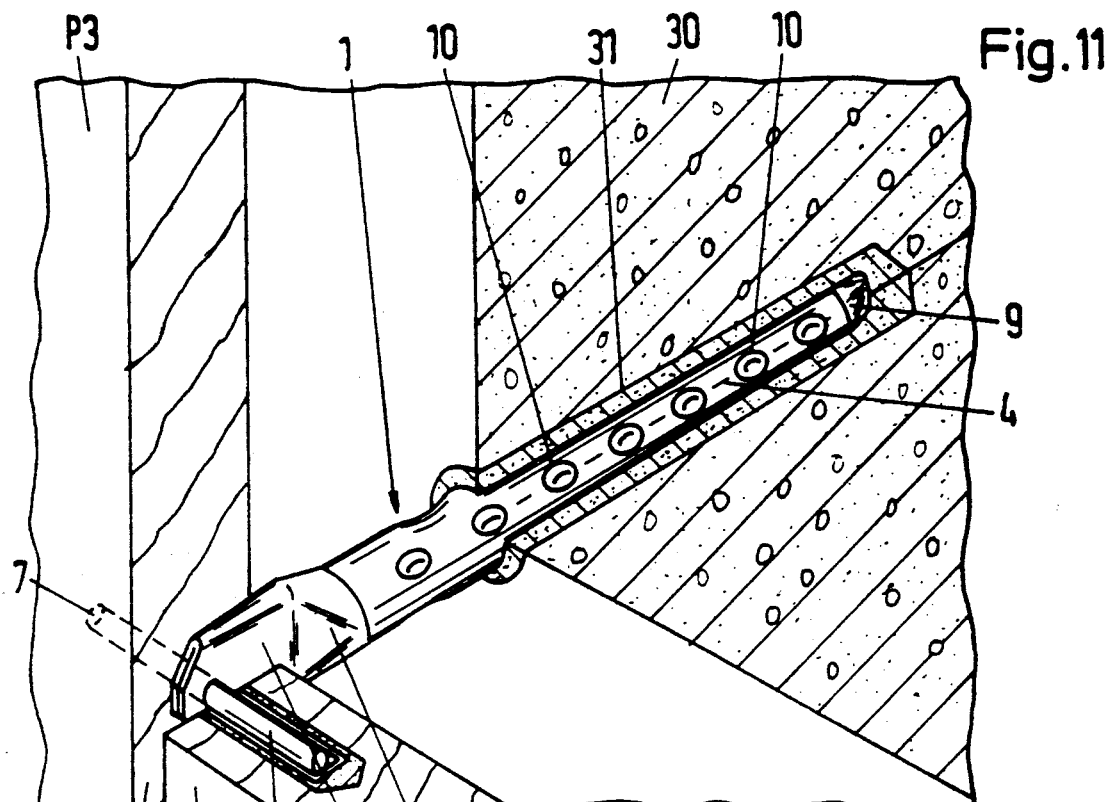

FIG. 11 shows that, as a result of the surface deformations 10 being placed outside the axial planes Y—Y or X—X, respectively, the same anchor 1 is also suitable for insertion in vertical joints 33 for holding plates P3, P4, in which case contact surface 6 is a vertical position, while it is horizontal in FIG. 12. As a result of the design of the anchor according to the present invention, the load carrying area of the anchor remains unchanged in these different built-in positions of the anchor, i.e. that area which transfers the supported load to the mounting base: it remains the same in the built-in positions shown in FIG. 11 and 12, such that anchors of this type are equally suitable for building-in in horizontal or vertical joints, as shown in FIGS. 11 and 12.

FIG. 11 shows that supporting section 2 engages the vertical joint 33 with lateral play, while holding pin 7 engages the boreholes in plates P3, P4 with axial play in both sides of the supporting section 2.

The embodiment shown by way of example in FIG. 2 differs from that in FIG. 1 by a different design of supporting section 2 and by the longitudinal section 4 being closed by a conically shaped cap 8.

Figure 7:
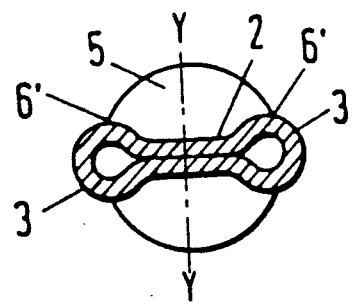

The front part of the tube is suitably deformed to provide the supporting section 2 with hollow ribs' 3 formed on both sides of the longitudinal axis A (FIG. 6) between which the walls of the tube are pressed together. It is seen in FIG. 7 that the hollow ribs 3 are arranged symmetrically with respect to both the Y—Y and X—X axial planes. They serve for reinforcing the supporting section against buckling, and expediently continue in the conical transition section 5. In the position shown in FIG. 7, the supported plates does not rest on a contact area, as is the case in the embodiments shown by way of example in FIGS. 1, 3, 5, 9, and 12, but rather on the parallel contact lines 6', 6'.

Figure 10:
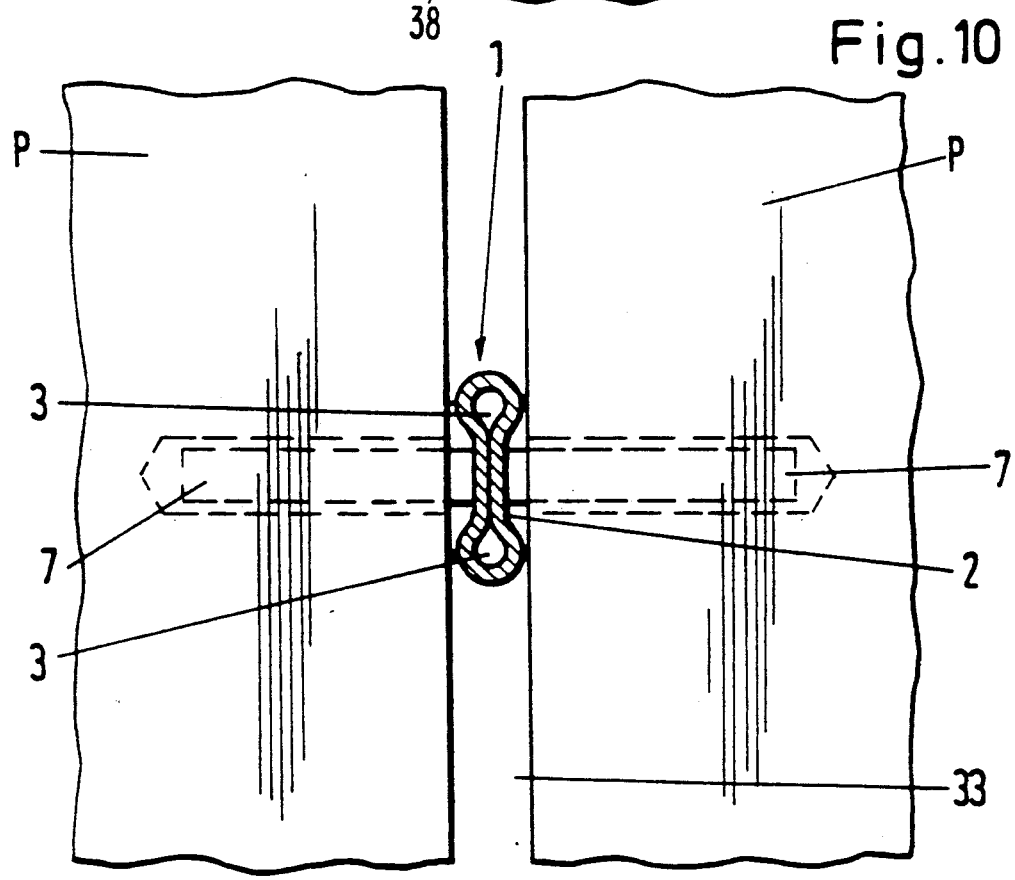

FIG. 10 shows the anchor 1 according to FIGS. 2 and 7 in a built-in position with the supporting section 2 located with play in a vertical joint 33 between two plates P, with the edges of the two plates P being at a small distance from the supporting section 2 or from its reinforcing ribs 3, respectively. Each holding pin 7 engages corresponding lateral boreholes in plates P with axial play to allow for thermal expansion.

Figure 8:
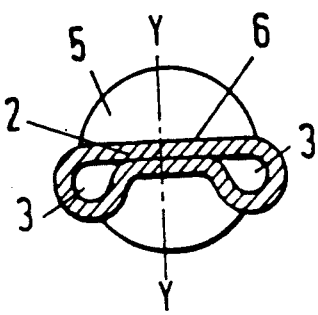

In the embodiment of the anchor shown by way of example in FIGS. 3 and 8 the free end of longitudinal section 4 remains open. The supporting section 2 is again provided with reinforcing ribs 3 arranged symmetrically with respect to the Y—Y axis. The hollow ribs 3 are formed only on that side of the supporting section 2 that faces away from the flat contact surface 6 on the other side of the supporting section 2 (FIG. 8).

Figure 9:
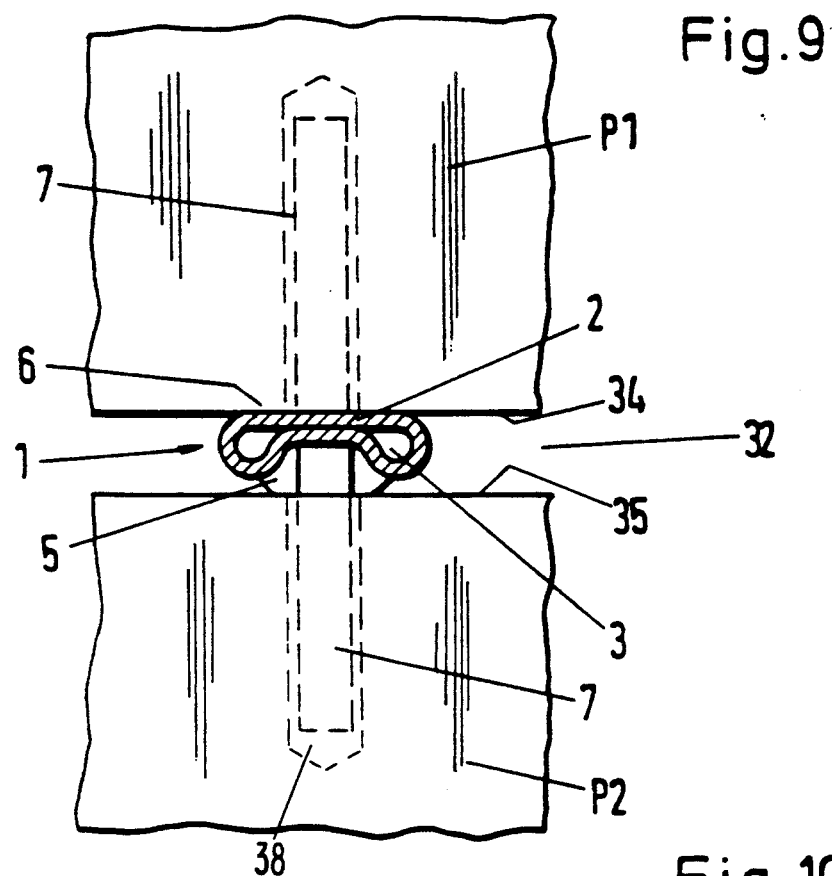

FIG. 9 shows the anchor according to FIGS. 3 and 8 built-in in a horizontal joint. The upper plate P1 sits with its supporting side on contact surface 6 and is secured in position by holding pin 7 engaging the supporting side. The lower plate P2 is located with its narrow holding side 35 at a certain distance from supporting section 2, with holding pin 7 engaging with axial play a borehole 38 in holding side 35.

Figure 5:
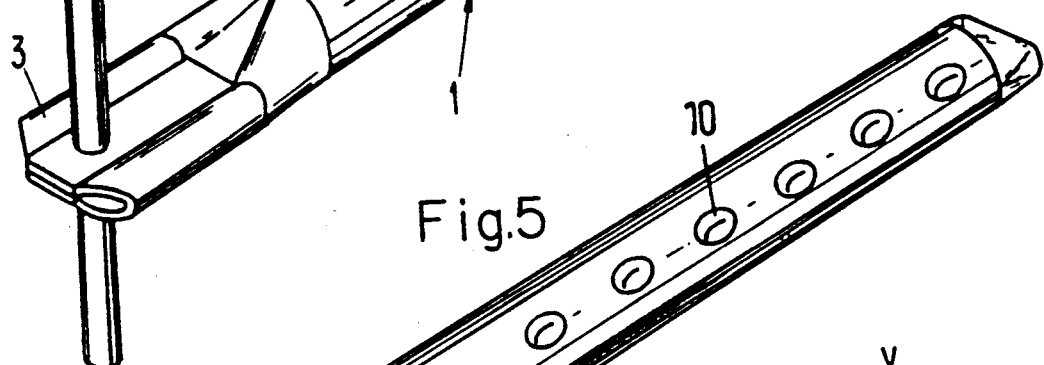

The embodiment of the anchor shown by way of example in FIG. 5 is provided with a set-off supporting section 2 parallel to, and set-off from the horizontal center plane of the anchor. The set-off position of the supporting section 2 is achieved by bending the conical transition section 5. An anchor 1 of this type can be subsequently inserted into the mounting base above a late being already placed in position since the borehole is located above the plate being already in position. The anchor according to FIG. 5 is suitable, furthermore, for use at the lower edge of the facing of a building since the borehole or the anchor itself, respectively, it completely masked by the facing plate to be mounted.

Figure 13:
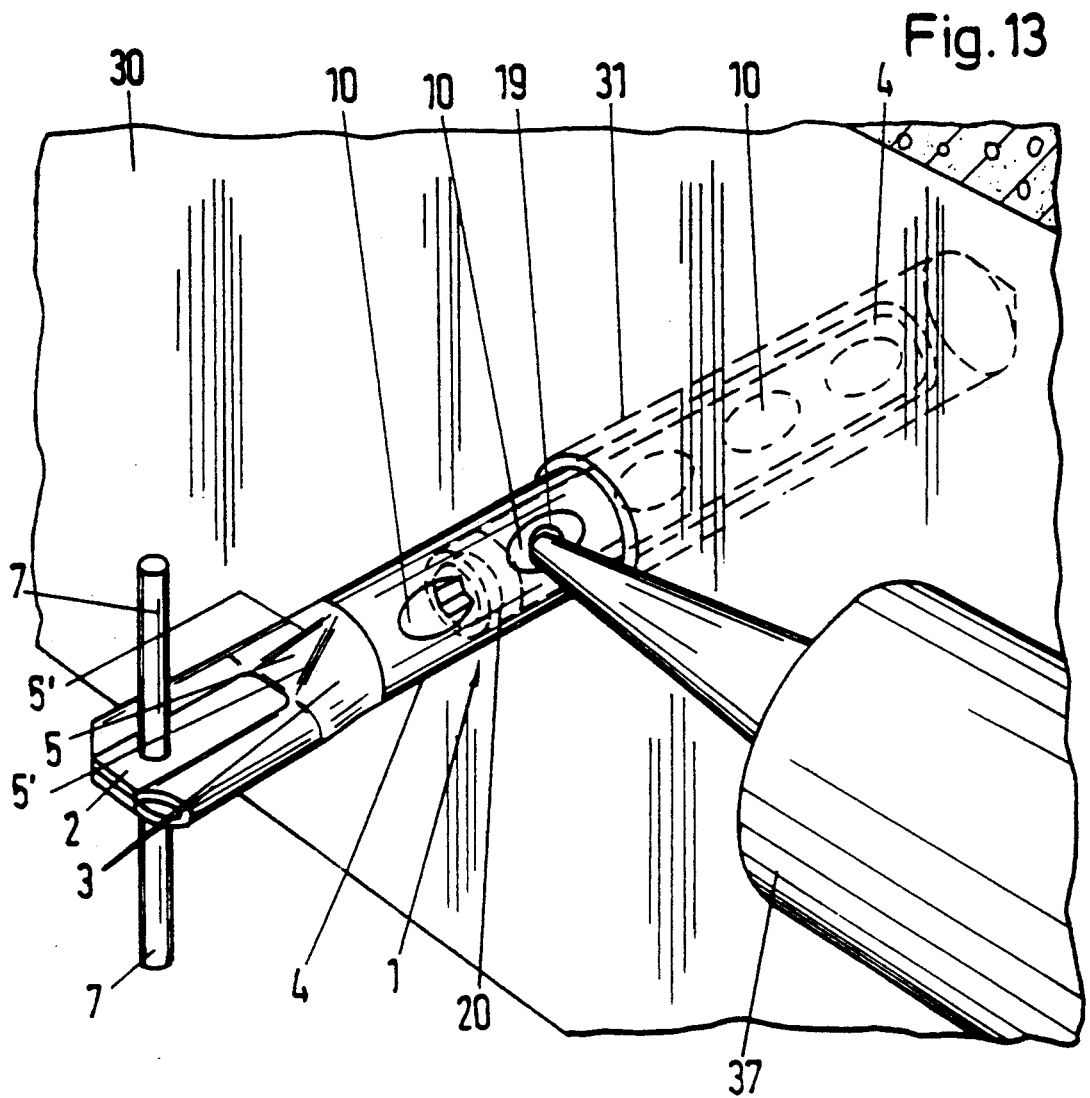

FIG. 13 shows an anchor that is advantageous for accurate positioning and cementing-in in a borehole. The anchor 1 corresponds to the above description, and is provided with an opening 19 in its longitudinal section 4, with said hole 19 being preferably located in an indentation 10. The opening 19 is suitably positioned such that it lies outside the borehole 31 if the anchor 1 has been accurately positioned in the borehole. A stopper 20 is inserted in the longitudinal section 4 which is open towards the bottom of borehole 31. The stopper 20 is preferably fixed in the interior of the tube between two dents 10 and closes the interior of the tube towards the supporting section 2 such that opening 19 opens into the rear part of the longitudinal section that is open towards the rear. It is expedient to axially place the stopper it its accurate position in longitudinal section 4 before the dents 10 are formed, such that it is held in position by the subsequently formed surface deformations (dents). This design ensures simple and reliable pouring of the mortar. Cement mortar is pressed by means of a spraying device 37 through opening 19 into the rear part of the tubular anchor. The mortar then emerges from the open end of the longitudinal section into the borehole 31 surrounding the anchor. Sufficient mortar is pressed-in through opening 19 until mortar emerges from the ring-shaped gap between anchor 1 and the wall of borehole 31 in the mounting base. This ensures cementing-in of the longitudinal section 4, and thereby of the anchor, in an absolutely leak-tight mass of mortar free from any cavities, with the indentations 10 a form-fit connection of longitudinal section 4 with the mortar on both the external and internal surfaces of the tubular longitudinal section 4.

The embodiment of the anchor shown in FIGS. 14 to 16 is provided with a supporting section positioned symmetrically with respect to both the X—X and Y—Y axial planes. Contact surfaces 6 are provided on both sides of the supporting section 2, which are inclined down towards the front edge 21 of supporting section 2. The contact surfaces 6 form an acute angle with the horizontal plane X—X. An equalization wedge 15, preferably of plastic, is placed between contact surface 6 and plate P sitting on it, with the wedge angle of wedge 15 corresponding to the angle of inclination of the contact surface 6 with respect to the X—X axial plane. The surfaces of wedge 15 and supporting section 2 are roughened, preferably toothed, to increase the coefficient of friction. The equalizing wedge is movable in longitudinal direction of anchor 1 after plate P has been placed on, such that plate P can be accurately positioned in height. Plate P is again secured in its position by holding pin 7. The equalizing wedge 15 is provided with a central slot 23 open towards the point of the wedge, in which slot the holding pin 7 is located.

Figure 17:
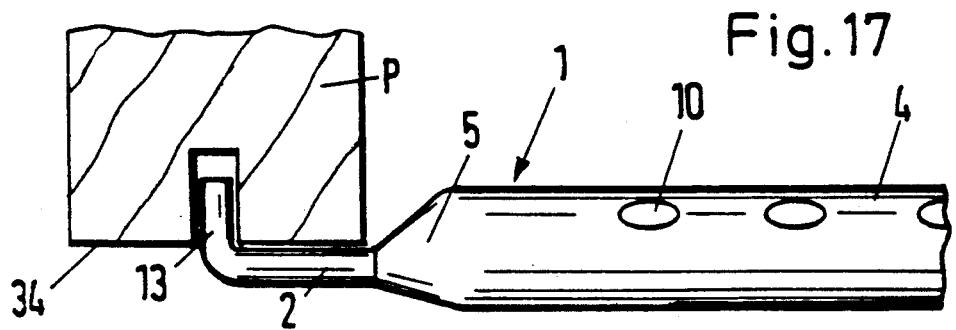

In the embodiment shown by way of example in FIG. 17 the free end 13 of the supporting section is bent at a right angle to form a preferably flat holding bracket which engages a recess in the supporting side of the plate P to be mounted, like in the embodiment shown in FIG. 12.

Figure 18:
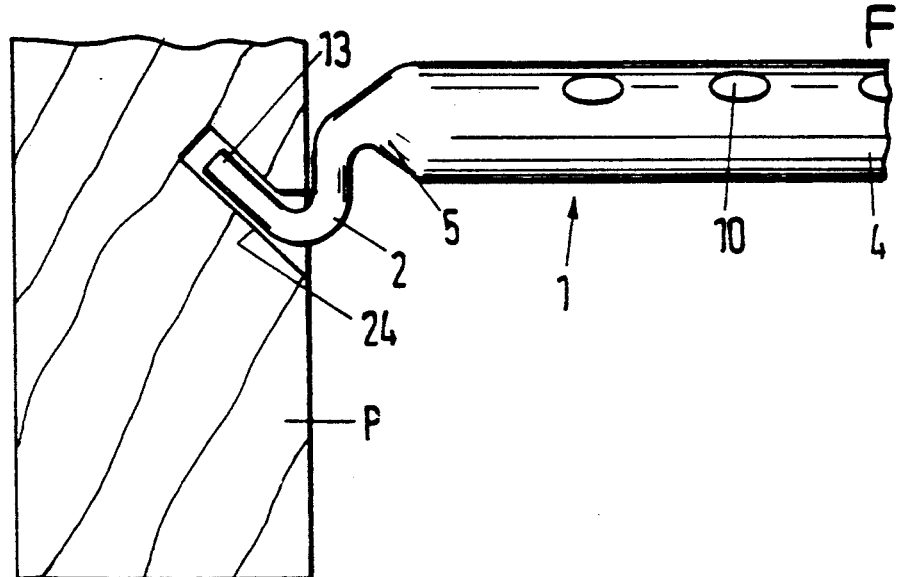

In the embodiment shown by way of example in FIG. 18 the supporting section 2 is bent down at a right angle immediately at the conical transition section 5, with the free end section 13 of the supporting section 2 being bent upward again at an angle of approximately 45°. This design is suitable for engaging a recess 24 inclined upwards in the backside of a plate P. The entire anchoring device is masked by the plate P.

Figure 19:
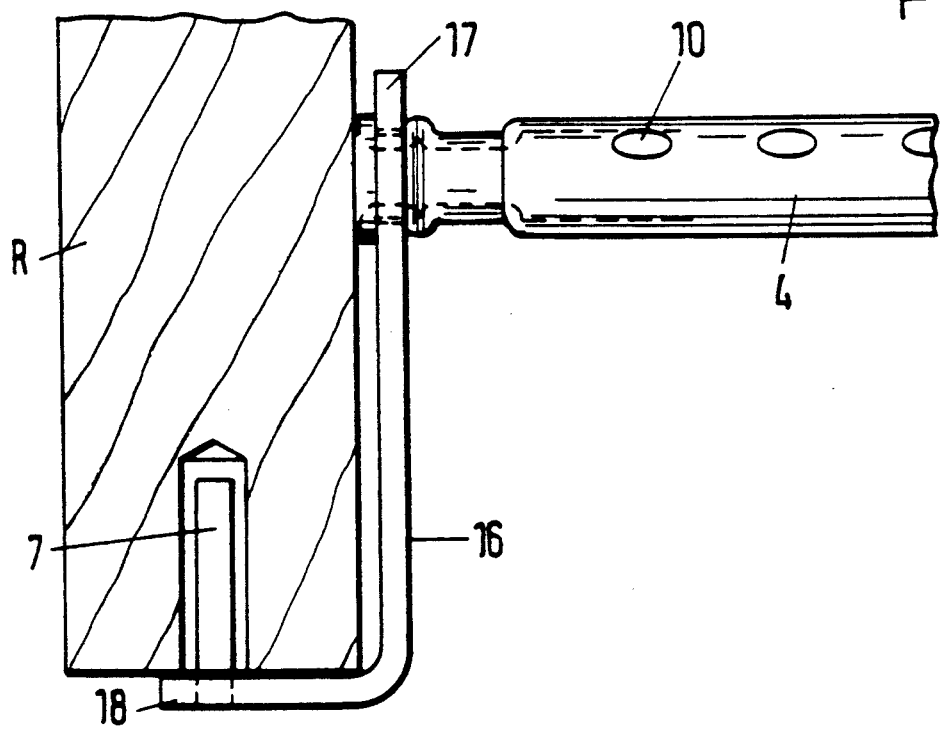

The embodiment of the holding and supporting anchor shown by way of example in FIG. 19 is provided with a supporting section in the shape of an iron bracket 15 attached to the tubular section. One arm 17 is attached to the end of the longitudinal section protruding from the mounting base, while the other end 18 carries a vertical holding pin 7 engaging a recess in the supporting side of the plate P to be mounted.

The longitudinal section of the anchors shown in FIGS. 20 and 21 is suitably shaped to prevent mortar from entering into the interior of the anchor when the anchor is inserted into the mounting base. This is achieved according to the present invention by the end section of longitudinal section 4 being suitably crimped (10a, 10b) to practically close the clear cross section of the tube that forms anchor 1. The crimped end (10a, 10b) is, accordingly, at that end of the longitudinal section 4 that faces away from supporting section 3, and replaces the closed tapered end 9 or the conical cap 8 shown in FIGS. 1 and 2. It is expedient to suitably crimp the end (10a) to form an E-shape of C-shape as shown in FIG. 20. It is also seen in FIG. 20 that part 12 of the wall of the crimp 10a that closes the tube can be deformed at least as far as the of the cross section of the tube, preferably coming into contact with the inner surface 13' of the opposite wall 13" of the tube (FIG. 20). The crimp 10a, 10b is expediently made longer in longitudinal direction of the tube, i.e. in direction of axis A, than it is wide. Furthermore, it may be provided with an opening 13''' on the face 14 of the longitudinal section 4 (FIG. 20). FIG. 21 shows a further embodiment of the crimped tube according to the present invention, where the crimp 10a at the rear part of longitudinal section 4 is shaped like a tube, i.e., it bends inward into the tube in such a manner that the internal cross section of the tube is closed. It may also be V-shaped or approximately V-shaped as is also recesses 10 (or protrusions 10' as in FIG. 4) seen in FIG. 21. It is expedient to locate this crimp 10b outside the surface with the crimps 10a, 10b being preferably oriented symmetrically with respect to the load carrying plane, i.e. to the Y—Y axis of the longitudinal section 4.

What is claimed is:

1. A holding and supporting anchor having a forward end and a rearward end and adapted to be mortared in a borehole of a construction element of concrete or masonry, comprising:

a supporting section at the forward end of said anchor, said supporting section adapted to protrude from said borehole to support at least one facing plate or the like spaced outwardly from said construction element and adapted to be located in a vertical plane;

said supporting section including at least one contact surface adapted to be oriented at a right angle to said vertical plane and at least one pin oriented at a right angle to said contact surface, said contact surface and said pin being adapted to engage and support said facing plate;

a longitudinal section rearwardly of said supporting section having a second forward and a second rearward end, said longitudinal section being a tube and adapted to extend at least partly into said borehole, wherein said tube has a longitudinal axis which is adapted to lie in a horizontal plane, an outer diameter of said longitudinal section being smaller than a diameter of said borehole;

the second rearward end of said longitudinal section being a tapered end and a substantially closed end; and a series of individual axially spaced deformities in said tube, said deformities being of limited peripheral dimension and being radially offset from wall areas of said tube immediately surrounding said deformities, said tube maintaining its diameter except where said deformities occur; said tube maintaining a continuous cross section even where said deformities occur which, together with the spacing of said deformities, does not weaken the resistance of said longitudinal tube to torsional stress, whereby when the supporting anchor is mortared in the borehole, said deformities absorb torsional, tensile and compressional forces acting on said anchor and transmit the same to said construction element, said supporting section and said tube forming a right unit against said forces.

2. The holding and supporting anchor as claimed in claim 1, further including a conical transitional section between the longitudinal section and the supporting section.

3. The holding and supporting anchor as claimed in claim 1, wherein lines formed by the intersection of a second vertical plane through the axis of said tube and said horizontal plane, with an outer surface of said tube, are not intersected by said deformities.

4. The holding and supporting anchor as claimed in claim 1, wherein said deformities comprises depressions in the form of dents projecting radially inward from an inner wall surface of the tube.

5. The holding and supporting anchor as claimed in claim 1, wherein said deformities comprise projections which extend radially outward from the outer surface of said tube.

6. The holding and supporting anchor as claimed in claim 1, wherein said deformities are arranged symmetrically with respect to said horizontal plane.

7. The holding and supporting anchor as claimed in claim 1, wherein the tube is self-enclosed and has a circular cross-section.

8. The holding and supporting anchor as claimed in claim 1, wherein said deformities are arranged at approximately diametrically opposed peripheral sections of the tube.

9. The holding and supporting anchor as claimed in claim 3, wherein said deformities are symmetrical with respect to an angle bisector of said second vertical and said horizontal planes.

10. The holding and supporting anchor as claimed in claim 1, wherein said supporting section and said longitudinal section are constructed as one piece.

11. The holding and supporting anchor according to claim 1, wherein said tapered end is formed by deformation of said longitudinal section.

12. The holding and supporting anchor according to claim 1, wherein said tapered end is formed by a conical cap attached to said longitudinal section.

13. The holding and supporting anchor according to claim 3, further including hollow ribs formed in said supporting section, said hollow ribs extending in the longitudinal direction of said anchor and arranged symmetrically with respect to said second vertical plane through the axis of said tube.

14. A holding and supporting anchor having a forward end and a rearward end and adapted to be mortared in a borehole of a construction element of concrete or masonry, comprising:

a supporting section at the forward end of said anchor, said supporting section adapted to protrude from said borehole to support at least one facing plate or the like spaced outwardly from said construction element and adapted to be located in a vertical plane;

said supporting section including at least one pin adapted to be oriented at right angles to said vertical plane, said pin being adapted to engage and support said facing plate;

a longitudinal section rearwardly of said supporting section having a second forward and a second rearward end, said longitudinal section being a tube and adapted to extend at least partly into said borehole, wherein said tube has a longitudinal axis adapted to lie in a horizontal plane, an outer diameter of said longitudinal section being smaller than a diameter of said borehole;

the second rearward end of said longitudinal section being a tapered end and a substantially closed end; and a series of individual axially spaced deformities in said tube, said deformities being of limited peripheral dimension and being radially offset from wall areas of said tube immediately surrounding said deformities, said tube maintaining its diameter except where said deformities occur; said tube maintaining a continuous cross section even where said deformities occur which, together with the spacing of said deformities, does not weaken the resistance of said longitudinal tube to torsional stress, whereby when the supporting anchor is mortared in the borehole, said deformities absorb torsional, tensile and compressional forces acting on said anchor and transmit the same to said construction element, said supporting section and said tube forming a rigid unit against said forces.

15. The holding and supporting anchor as claimed in claim 14, further including a conical transitional section between the longitudinal section and the supporting section.

16. The holding and supporting anchor as claimed in claim 14, wherein lines formed by the intersection of a second vertical plane through the axis of said tube and said horizontal plane, with an outer surface of said tube, are not intersected by said deformities.

17. The holding and supporting anchor as claimed in claim 14, wherein said deformities comprise depressions in the form of dents projecting radially inward from an inner wall of the tube.

18. The holding and supporting anchor as claimed in claim 14, wherein said deformities comprise projections which extend radially outward from the outer surface of said tube.

19. The holding and supporting anchor as claimed in claim 14, wherein said deformities are arranged symmetrically with respect to said horizontal plane.

20. The holding and supporting anchor as claimed in claim 14, wherein the tube is self-enclosed and has a circular cross-section.

* * * * *